United States Patent
Matsen et al.

(10) Patent No.: US 6,855,917 B2
(45) Date of Patent: Feb. 15, 2005

(54) INDUCTION PROCESSABLE CERAMIC DIE WITH DURABLE DIE LINER

(75) Inventors: Marc R. Matsen, Seattle, WA (US); Ronald W. Brown, Des Moines, WA (US); John R. Fischer, Seattle, WA (US); Brad L. Kirkwood, Kent, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 10/011,090

(22) Filed: Dec. 6, 2001

(65) Prior Publication Data

US 2003/0106890 A1 Jun. 12, 2003

(51) Int. Cl.⁷ ................................................ H05B 6/22
(52) U.S. Cl. ...................... 219/659; 219/634; 219/649
(58) Field of Search ............................. 219/649, 659, 219/647, 603, 604, 615, 617, 633, 634, 635, 643; 148/520, 570, 571; 72/62, 342.96; 425/78

(56) References Cited

U.S. PATENT DOCUMENTS

| | | | |
|---|---|---|---|
| 3,694,115 A | * | 9/1972 | Steingroever ................. 425/78 |
| 4,769,346 A | * | 9/1988 | Gadkaree et al. .............. 501/9 |
| 5,064,597 A | | 11/1991 | Kim |
| 5,077,242 A | * | 12/1991 | Nakamoto et al. ......... 501/95.2 |
| 5,139,407 A | | 8/1992 | Kim et al. |
| 5,410,132 A | | 4/1995 | Gregg et al. |
| 5,436,042 A | * | 7/1995 | Lau et al. ................... 428/34.6 |
| 5,477,722 A | * | 12/1995 | Dziedzic et al. ............... 72/347 |
| 5,489,410 A | | 2/1996 | Baumgartner et al. |
| 5,530,227 A | | 6/1996 | Matsen et al. |
| 5,587,098 A | * | 12/1996 | Matsen et al. .............. 219/615 |
| 5,645,744 A | | 7/1997 | Matsen et al. |
| 5,683,608 A | | 11/1997 | Matsen et al. |
| 5,728,309 A | | 3/1998 | Matsen et al. |
| 5,747,179 A | | 5/1998 | Matset et al. |
| 5,925,277 A | | 7/1999 | Scoles |
| 6,091,063 A | | 7/2000 | Woods |
| 6,211,497 B1 | | 4/2001 | Matsen et al. |
| 6,235,381 B1 | | 5/2001 | Sanders et al. |
| 6,279,425 B1 | | 8/2001 | Cicotte |
| 6,322,645 B1 | * | 11/2001 | Dykstra et al. ............. 148/520 |

FOREIGN PATENT DOCUMENTS

| | | |
|---|---|---|
| EP | 335 100 | 3/1995 |
| EP | 505 738 | 9/1997 |
| JP | 63-268524 | 11/1988 |
| JP | 2-34232 | 2/1990 |
| WO | PCT/US00/21405 | 4/2001 |
| WO | 01/23116 A1 | 4/2001 |

* cited by examiner

*Primary Examiner*—Tu Hoang
(74) *Attorney, Agent, or Firm*—Harness Dickey & Pierce P.L.C.

(57) ABSTRACT

A die liner for use in a die having a die body wherein the die body is configured to form a workpiece. The die liner is a discrete structure that is configured to be used in conjunction with the die body. The die liner defines a forming surface for forming the workpiece and is configured to have at least one characteristic that is different than a corresponding characteristic of the die body such that the die liner increases the durability of the die.

29 Claims, 5 Drawing Sheets

INDUCTION PROCESSABLE CERAMIC DIE WITH DURABLE DIE LINER

NOTICE OF GOVERNMENT RIGHTS

This invention was made with United States Government support under ATP/NIST Project ID 1998-01-0168U awarded by NIST. The United States Government has certain rights in the invention.

FIELD OF THE INVENTION

The present invention generally relates to ceramic forming dies and more particularly to a ceramic forming die having a durable die liner that protects the integrity of the die to thereby extend the useful life of the die.

BACKGROUND OF THE INVENTION

Fiber-reinforced resin (i.e., organic matrix) composite materials have become widely used, have a high strength-to-weight or high stiffness-to-weight ratio, and desirable fatigue characteristics that make them increasingly popular in weight, strength or fatigue critical applications.

Prepregs consisting of continuous, woven, or chopped fibers embedded in an uncured matrix material are cut to the desired shape and then stacked in the desired configuration of the composite part. The prepreg may be placed (laid-up) directly upon a tool or die having a forming surface contoured to the desired shape of the completed part or the prepreg may be laid-up in a flat sheet and the sheet may be draped over a tool or die to form to the contour of the tool. After being laid-up, the prepreg is consolidated (i.e., cured) in a conventional vacuum bag process in an autoclave (i.e., a pressurized oven). The pressure presses the individual layers of prepreg together at the consolidation/curing temperatures that the matrix material flows to eliminate voids and cures, generally through polymerization.

In autoclave fabrication, the composite materials must be bagged, placed in the autoclave, and the entire heat mass of the composite material and tooling must be elevated to and held at the consolidation or curing temperature until the part is formed and cured. The formed composite part and tooling must then be cooled, removed from the autoclave, and unbagged. Finally, the composite part must be removed from the tooling. To supply the required consolidation pressures, it is necessary to build a special pressure box within the autoclave or to pressurize the entire autoclave, thus increasing fabrication time and cost, especially for low rate production runs. Autoclave tools upon which composite materials are laid-up are typically formed of metal or a reinforced composite material to insure proper dimensional tolerances and to withstand the high temperature and consolidation forces used to form and cure composite materials. Thus, autoclave tools are generally heavy and have large heat masses. The entire heat mass of the tool must be heated along with the composite material during curing and must be cooled prior to removing the completed composite part. The time required to heat and cool the heat mass of the tools adds substantially to the overall time necessary to fabricate a single composite part.

In composite parts requiring close tolerances on both the interior and exterior mold line of the part, matched autoclave tooling must be used. When matched tooling is used, autoclave consolidation pressure is used to force the matched tooling together to consolidate the composite material and achieve proper part dimensions. Matched tooling is more expensive than open faced tooling and must be carefully designed to produce good results, adding to part fabrication costs.

An alternative to fabricating composite parts in an autoclave is to use a hot press. In this method, the prepreg is laid-up, bagged (if necessary), and placed between matched metal tools that include forming surfaces that define the internal and external mold lines of the completed part. The tools and composite material are placed within the press and then heated. The press brings the tools together to consolidate and form the composite material into the final shape. Fabricating composite parts in a hot press is also expensive due to the large capital expense and large amounts of energy required operate the press and maintain the tools.

Generally, in hot press operations, to obtain close tolerances, the massive, matched tooling is formed from expensive metal alloys having low thermal expansion coefficients. The tooling is a substantial heat sink that takes a large amount of energy and time to heat to composite material consolidation temperatures. After consolidation, the tooling must be cooled to a temperature at which it is safe to remove the formed composite part thus adding to the fabrication time.

U.S. Pat. No. 5,683,608 entitled "Ceramic Die for Induction Heating Work Cells", which is hereby incorporated by reference as if fully set forth herein, discloses a ceramic die for use in an induction heating work cell that incorporates segments of the induction coil in a spaced array within a cast ceramic or phenolic body. A peripheral compression frame, typically of phenolic, surrounds the die body and applies a compressive load to the die body through lateral and transverse reinforcing rods that are cast into the die body. Matched dies close to direct heat in a workpiece that is located at the center of the induction coil.

U.S. Pat. No. 5,728,309 entitled "Method for Achieving Thermal Uniformity in Induction Processing of Organic Matrix Composites or Metals" and U.S. Pat. No. 5,645,744 entitled "Retort for Achieving Thermal Uniformity in Induction Processing of Organic Matrix Composites or Metals", both of which are hereby incorporated by reference as if fully set forth herein, disclose methods for forming a metal or composite workpiece sheet with a ceramic die. In each method, at least one susceptor sheet is abutted against a workpiece sheet. The susceptor sheet has a Curie temperature that is about equal to the temperature to which the workpiece is to be heated. Temperature uniformity is achieved because the magnetic permeability of the susceptor sheet falls to unity at the Curie temperature, causing the temperature of the workpiece to be maintained at that level.

While these advancements have done much to reduce the processing time and improve the quality of the finished article, several issues remain. One issue concerns the durability of the die in production runs of a relatively long duration (i.e., greater than about 250 pieces). The forming surface of the die tends to degrade with use, typically cracking in response to cyclical stresses and/or failing as a result of chemical incompatibilities with the susceptors at elevated temperatures or with the resins and chemicals in the composite prepegs or layups if susceptors are not utilized. Consequently, relatively large production runs typically require multiple sets of dies, which further increases the cost of these parts.

SUMMARY OF THE INVENTION

In one preferred form, the present invention provides a die liner for use in a die having a die body wherein the die body is configured to form a workpiece. The die liner is a discrete structure that is configured to be used in conjunction with the die body. The die liner defines a forming surface for forming the workpiece and is configured to have at least one characteristic that is different than a corresponding characteristic of the die body such that the die liner increases the durability of the die.

In another preferred form, the present invention provides a die for use in a forming apparatus. The die includes a die body and a discrete liner. The die body has a cast portion that is formed from a first material. The liner is coupled to the cast portion of the die body and defines a die cavity and a forming surface. The liner is formed from a second material that is different than the first material. The second material is relatively more durable than the cast portion of the die body so as to permit extended use of the die.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
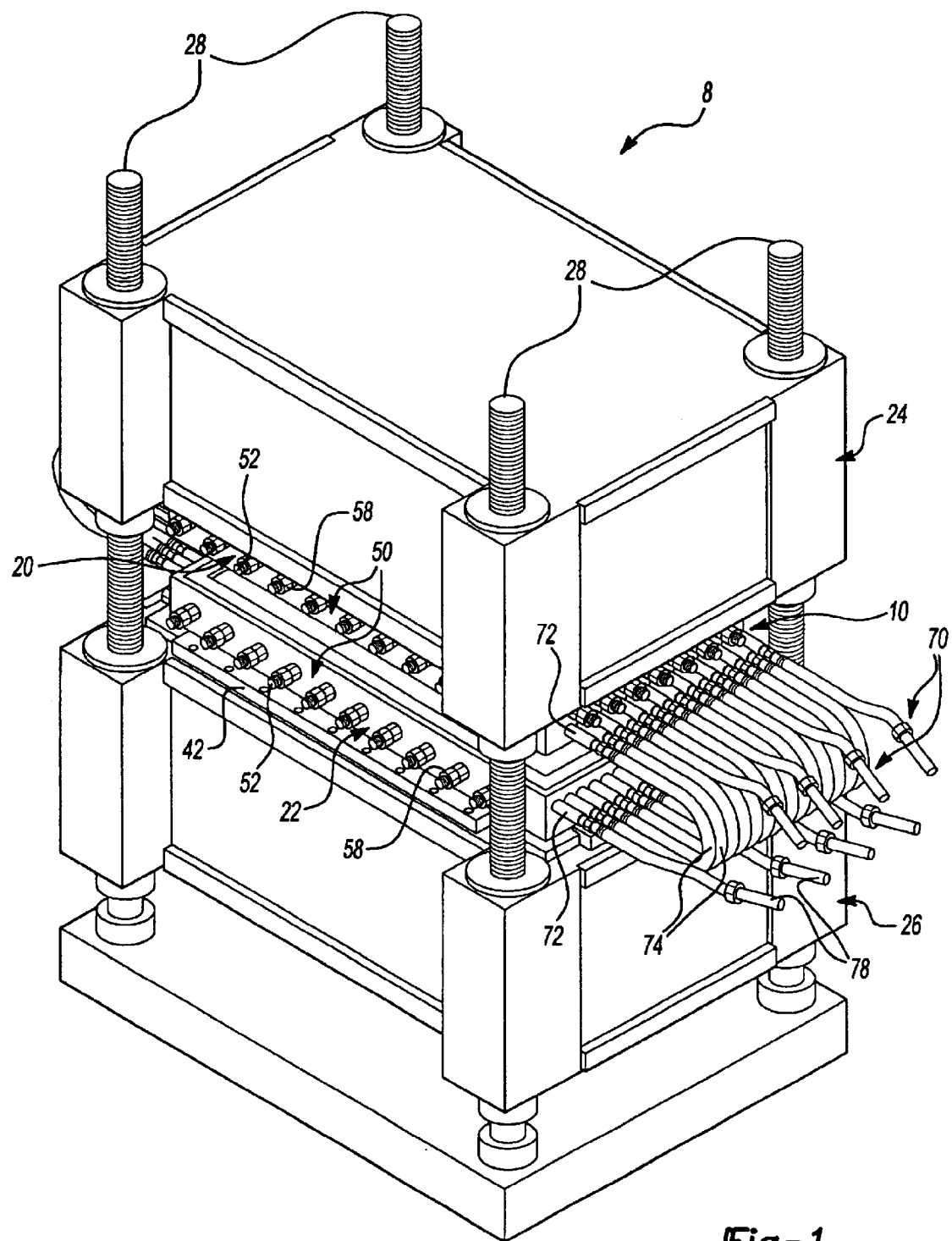
FIG. 1 is a perspective view of an apparatus for consolidating and forming organic matrix composite panels having a ceramic die set that is constructed in accordance with the teachings of the present invention.

With reference to FIG. 1 of the drawings, a forming apparatus 8 is illustrated to include a die set 10 that is constructed in accordance with the teachings of the present invention. In the particular example provided, the forming apparatus 8 is illustrated to be an inductive heating forming apparatus, but those skilled in the art will understand that the principles of the present invention are also applicable to other hot and cold forming dies as well. The die set 10 includes a pair of mating tools or dies 20 and 22, which are shown to be mounted within an upper strongback 24 and a lower strongback 26, respectively. The strongbacks 24 and 26 are each threaded onto four threaded column supports or jackscrews 28. The jackscrews 28 can be turned using a bellows or other actuation mechanism to move the upper and lower strongbacks 24 and 26 relative to one another.

Each strongback 24 and 26 provides a rigid, flat backing surface for its associated die 20 and 22 to prevent the dies 20 and 22 from bending and cracking during repeated consolidation and forming operations. Preferably, the strongbacks 24 and 26 are capable of holding the dies to a surface tolerance of +/−0.003 inches per square foot of the forming surface in the toolbox. Such tolerances help to insure that proper part tolerances are achieved. The strongbacks 24 and 26 may be formed of steel, aluminum, or any other material capable of handling the loads present during forming. However, materials that are nonmagnetic such as aluminum or some steel alloys are preferred to avoid any distortion to the magnetic field produced by the induction coils described below. In some circumstances, the dies 20 and 22 may be strong enough without the strongbacks.

Figure 2:
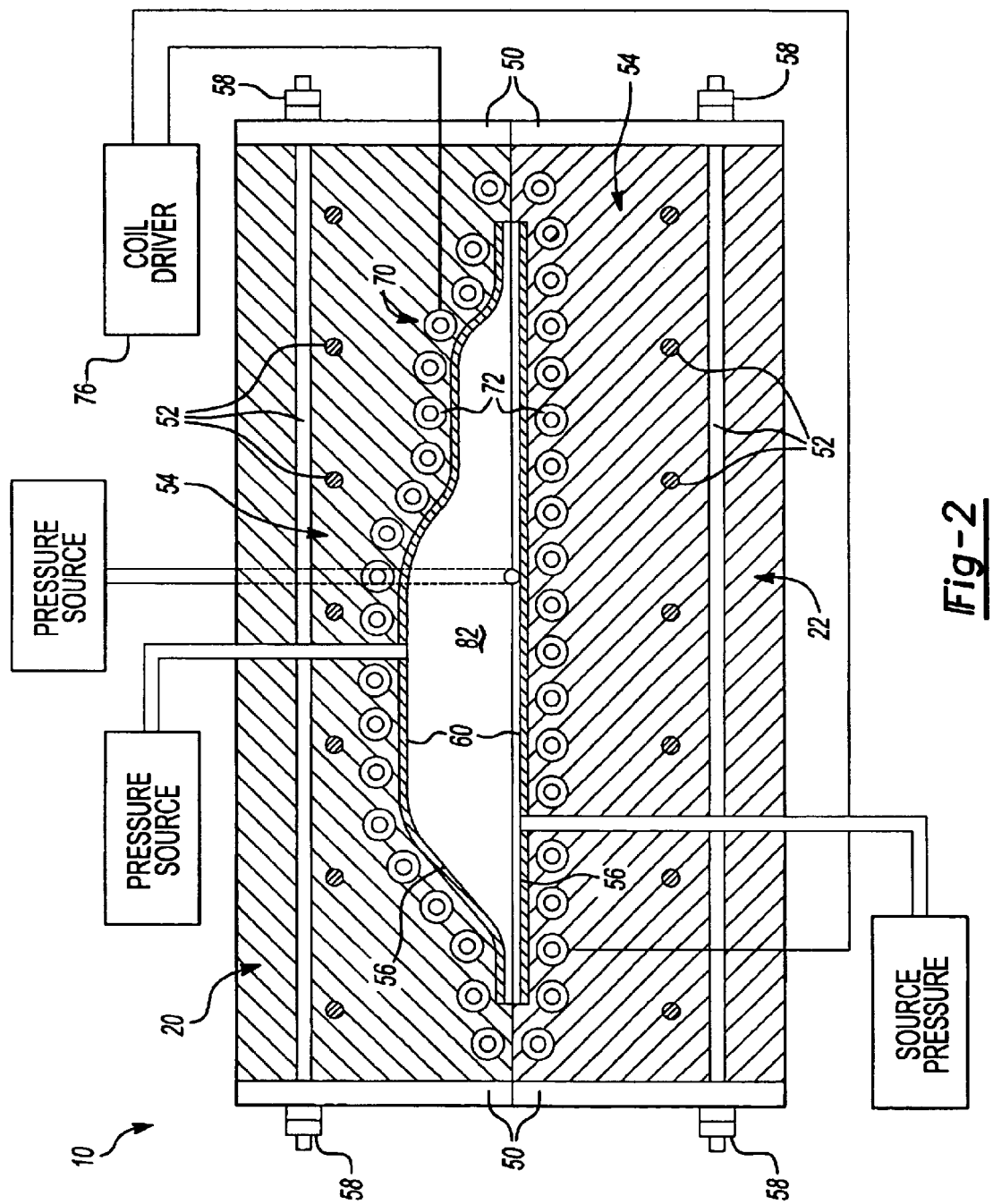
FIG. 2 is a schematic cross-sectional view of the apparatus of FIG. 1.
Figure 3:
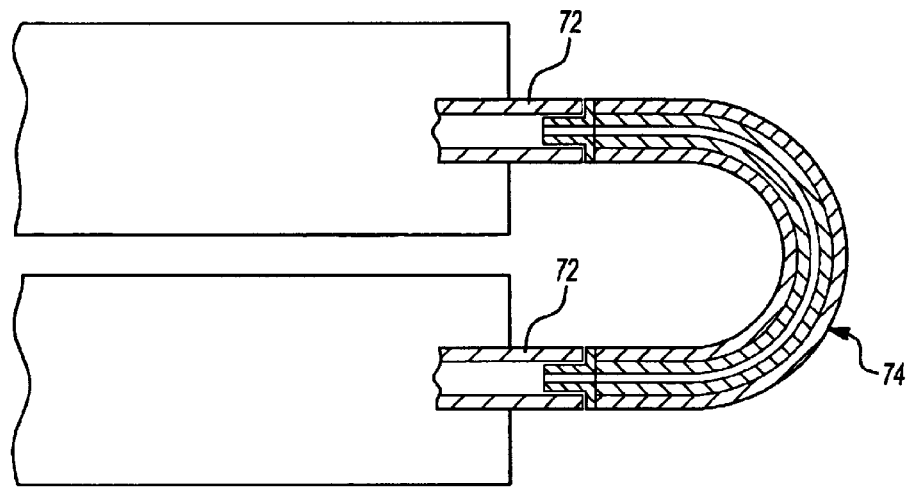
FIG. 3 is a cross-sectional view of a flexible coil connector.
Figure 4:
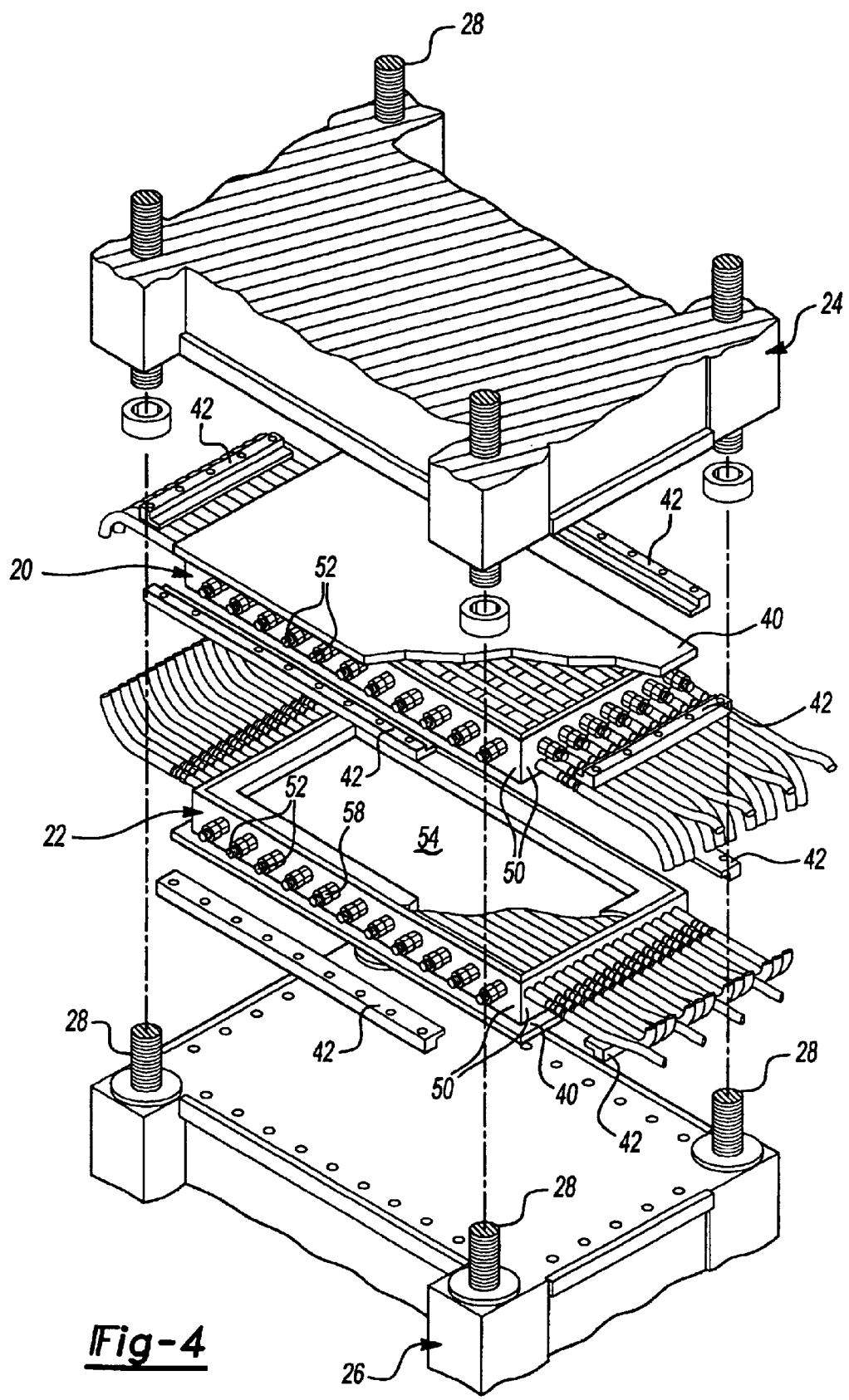
FIG. 4 is a partially exploded, partially cut away view of a portion of the apparatus of FIG. 1

With additional reference to FIGS. 2 through 4, each of the dies 20 and 22 may be attached to its associated strongback 24 and 26 by any suitable fastening devices, such as bolts or clamps. In the preferred embodiment, the dies 20 and 22 are mounted on support plates 40 which are held in place on an associated one of the strongbacks 24 and 26 through the use of clamping bars 42. The clamping bars 42 extend around the peripheral edges of the support plates 40 and are bolted to their respective strongback 24 and 26 via fasteners (not shown).

Each of the dies 20 and 22 are illustrated to include a plurality of containment walls 50, a plurality of reinforcing rods 52, a die body 54, and a die liner 56. In the particular embodiment illustrated, the containment walls 50 are made of a material, such as phenolic, that is not susceptible to inductive heating, and which has a low coefficient of thermal expansion, good thermal shock resistance, and relatively high compression strength. Each of the containment walls 50 abuts two of the other containment walls 50 which extend transversely thereto.

The reinforcing rods 52, which are formed from fiberglass, extend both longitudinally and laterally through the containment walls 50 in a grid-like manner. The reinforcing rods 52 are preferably not electrically conductive so that they are not susceptible to induction heating. Alternatively, the reinforcing rods 52 may also be formed from an electrically conductive material but are preferably arranged such that they are not susceptible to induction heating. Tensioning nuts 58 are initially employed to apply a light clamping force to the containment walls 50 to maintain their relationship relative to one another prior to and during the formation of the die body 54.

Each die body 54 is made of a first material that is not susceptible to inductive heating, such as a composite or ceramic material, which preferably has a low coefficient of thermal expansion, good thermal shock resistance, and relatively high compression strength. One preferred material is a castable fused silica ceramic. One method by which the die bodies may be constructed is described in commonly assigned U.S. Pat. No. 6,235,381 entitled "Reinforced Ceramic Structures", the disclosure of which is hereby incorporated by reference as if fully set forth herein.

The die liner 56 is formed from a second material which is also not susceptible to inductive heating but which is relatively more durable than the first material. In this regard, the second material has at least one characteristic, such as material strength (e.g., tensile strength, shear strength, compression strength, or fatigue strength) or chemical resistance, that is different than the corresponding characteristic of the first material, which causes the die liner 56 to be relatively more durable.

The second material is preferably a SiNi that is slip cast into the shape of interest, or a ceramic matrix composite that may be formed, for example, from a polymeric sol-gel (organosilane or glass ceramic sol) and continuous or chopped fibers of silicon carbide (e.g., Nicalon), which produces a silicon carbide matrix, or aluminum oxide (e.g., Nextel 312 or 440), which produces an alumino-silicate matrix. Typically, the die liner 56 has a thickness that is between about 2.0 mm (0.08 inch) and about 3.2 mm (0.13 inch), although die liners of other thicknesses may be utilized in appropriate situations. The die liner 56 is cured (dried) and sintered, as necessary, and fixedly coupled to its associated die body 54 to operatively form the forming surface 60 of its associated die 20 and 22. Preferably, the die body 54 of each die 20 and 22 is cast onto the die liner 56 (i.e., bulk ceramic is cast onto the non-part side of the die liner 56).

A plurality of induction coils 70 extend longitudinally through the length of the dies 20 and 22. In the preferred embodiment, four separate induction coils 70 are used, however, other quantities of induction coils may also be employed. Each induction coil 70 is formed from a plurality of straight tubing sections 72 and a plurality of flexible coil connectors 74. Each of the straight tubing sections 72 extends along the length of the die 20 and 22 in which it is disposed. The straight tubing sections 72 are preferably formed from a lightly drawn copper tubing that is approximately 25.4 mm (1.00 inch) in diameter with a wall thickness of about 1.6 mm (0.63 inch) and are preferably placed within the die body 54 such that they are about 19.0 mm (0.75 inch) away from the forming surface 60. Each of the flexible coil connectors 74 couples one of the straight tubing sections 72 in the die 20 to one of the straight tubing sections 72 in the die 22. The induction coils 70 are connected to an external power source or coil driver 76 and to a source of coolant by connectors 78 located at the ends of the inductive coils 70.

To increase the strength of the die body 54, the reinforcing rods 52 are tensioned after the die body 54 has been formed. Post-tensioning of the reinforcing rods 52 exerts a compressive load on the die body 54. Since the cast ceramic of the die body typically has good compressive strength but low tensile strength, this technique, which is similar to that for pre-stressing concrete, is utilized in the die construction to maintain the tolerances of the dies 20 and 22 and to prevent cracking or other damage during the use of the die set 10.

Figure 5:
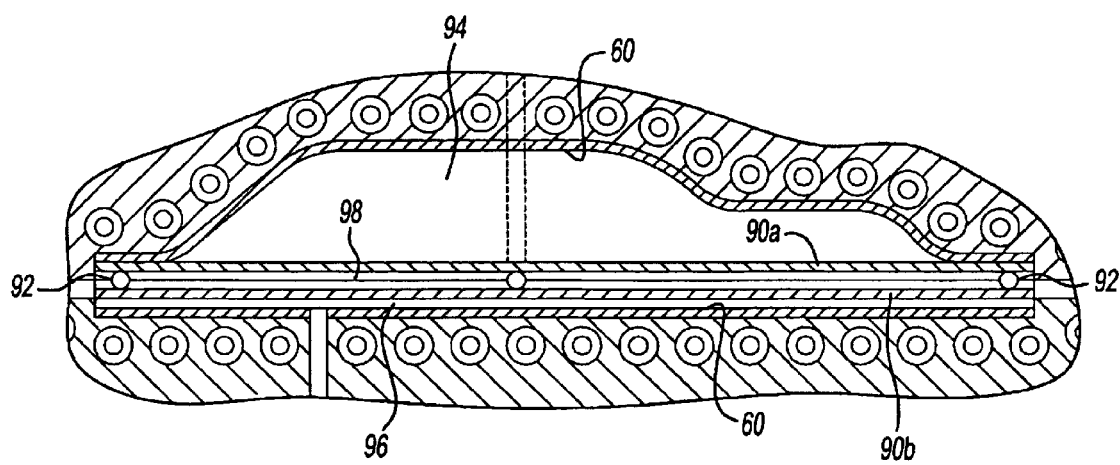
FIG. 5 is a view similar to that of FIG. 2 but illustrating a pair of workpieces loaded into the die set and in an unformed condition.
Figure 6:
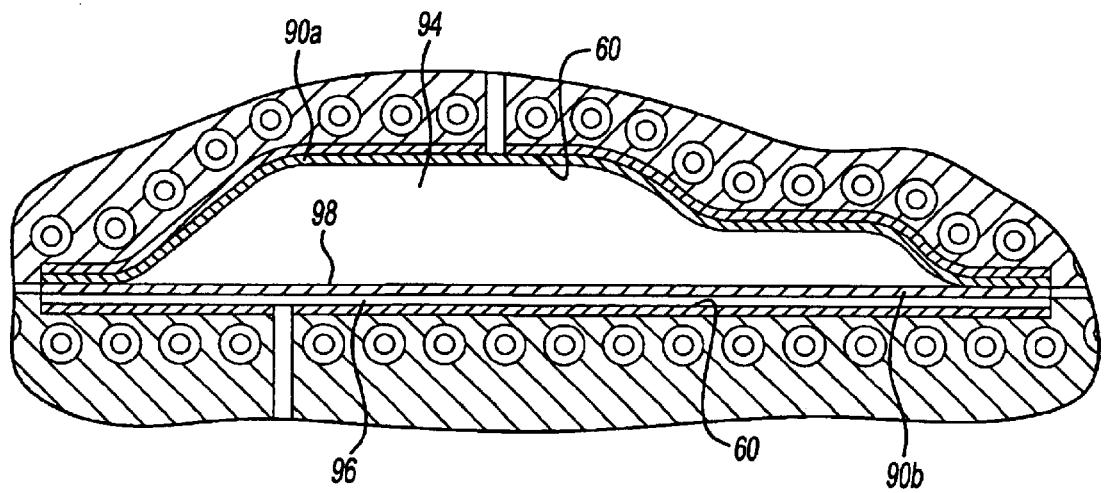
FIG. 6 is a view similar to that of FIG. 5 but illustrating the workpieces in a formed condition.

When the dies 20 and 22 are closed toward one another, their forming surfaces 60 cooperate to define a die cavity 82. In the example provided, the die set 10 is employed for a superplastic forming operation wherein a pair of titanium workpieces 90a and 90b are to be simultaneously formed by the dies 20 and 22 and brazed together as shown in FIGS. 5 and 6. In operation, a piece of brazing material 92 is place between the workpieces 90a and 90b and the workpieces 90a and 90b are loaded between the dies 20 and 22. The jackscrews 28 (FIG. 1) are then employed to abut the dies 20 and 22 against the workpieces 90a and 90b and develop a clamping force having sufficient magnitude to facilitate the superplastic forming operation. An inert atmosphere is preferably introduced into the die cavity 82 to protect the workpieces 90a and 90b from oxidization.

The coil driver 76 and a coolant source are actuated to provide the induction coils 70 with both a time varying electrical field and coolant. In response to the electrical field produced by the coil driver 76, the induction coils 70 produce electromagnetic flux that is employed to heat the workpieces 90a and 90b to a desired temperature prior to their superplastic forming. In the example provided, temperature control is achieved by controlling the input power that is fed to the induction coils 70 so that the desired temperature is maintained at a relatively constant level for a predetermined time, ranging from several minutes to several hours, while the processing of the workpieces 90a and 90b is completed.

The coolant that flows through the induction coils 70 removes excess heat to thereby insure that the copper from which they are made does not melt during the heating of the workpieces 90a and 90b. When the workpieces 90a and 90b have heated sufficiently, a gas, such as argon, that is under sufficient pressure is introduced into the die cavity 82 in the space or compartment 94 between the forming surface 60 of the die 20 and the workpiece 90a, the compartment 96 between the forming surface 60 of the die 22 and the workpiece 90b, and the compartment 98 between the workpieces 90a and 90b. The pressure in each of the compartments 94, 96 and 98 is regulated so as to control the rate by which the workpieces 90a and 90b deform. Those skilled in the art will understand that the compartments 94 and 96 may alternatively be evacuated (i.e., under a vacuum). Due to the elevated temperature of the workpieces 90a and 90b, they are relatively ductile and readily deform under the pressure of the gas such that they are pushed into conformance with the forming surface 60 of a respective one of the dies 20 and 22. Furthermore, the brazing material 92 melts at this elevated temperature and creates a strong bond around the perimeter of the workpieces 90a and 90b which fixedly couples them to one another. When the workpieces 90a and 90b have been formed and bonded to one another, the time varying electrical field is removed from the induction coils 70. If desired, the flow of coolant to the induction coils 70 may be maintained so as to cool the die set 10 and workpieces 90a and 90b.

As should be apparent to those skilled in the art, the forming surface 60 of each die 20 and 22 is formed taking into account the shrinkage of the workpieces 90a and 90b, as well as any processing shrinking inherent in the material from which the durable die liner 56 is formed. Those skilled in the art will understand that the die liner 56 provides a layer that is both strong and tough to thereby protect the ceramic material of the die body 54 from direct contact during the processing of the workpieces 90a and 90b, as well as incidental damage that could otherwise be incurred during the transport, set-up and storage of the die set 10.

Figure 7:
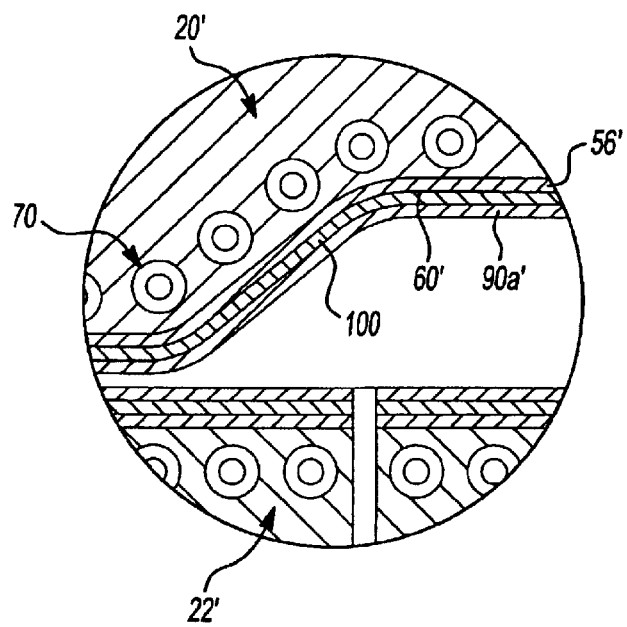
FIG. 7 is a partial section view of a die set constructed in accordance with the teachings of a second embodiment of the present invention.

While the die set 10 has been described thus far as including a durable die liner 56 having a forming surface 60 that forms the outer mold line of a workpiece, those skilled in the art will appreciate that the invention, in its broader aspects, may be constructed somewhat differently. For example, the dies may be formed with a die liner 56' that is configured for use with a pair of susceptor sheets 100 as illustrated in FIG. 7. As a susceptor sheet 100 is disposed between each workpiece 90a' and 90b' and its associated die 20' and 22', respectively, the forming surface 60' of the die liner 56' is enlarged relative to the prior embodiment to accommodate the presence of the susceptor sheet 100. As disclosed in the above-referenced U.S. Pat. Nos. 5,645,744 and 5,728,309, the susceptor sheets 100 are selected based on their Curie temperature so as to facilitate temperature control at about the predetermined temperature. In this regard, the electromagnetic flux that is produced by the induction coils 70 travels through the ceramic and into the susceptor sheets 100 as they are magnetic and tightly house the electromagnetic flux. The susceptor sheets 100 heat in response to receipt of the electromagnetic flux until the Curie temperature is reached, as the susceptor sheets 100 become nonmagnetic and are much less susceptible to induction heating because the time varying magnetic field will induce less concentrated currents throughout the depth of the material. Therefore, induction heating above the Curie temperature requires a substantial increase in input current over that which is required for sustained operation at the Curie temperature since the nonmagnetic phase of the susceptor sheet 100 heats inefficiently. Accordingly, by judiciously selecting a susceptor based on its Curie temperature, maximum temperature control which is uniform throughout the susceptor can be guaranteed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A die for use in a forming apparatus that uses inductive heating, the die comprising:
    a die body having a cast portion that is formed from a first material;
    a discrete liner coupled to the die body, the liner defining a die cavity and a forming surface, the liner being formed from a second material that is different from the first material, the second material also being a fiber-reinforced, sintered ceramic composite that is relatively more durable than the cast portion of the die body; and
    wherein the fiber-reinforced, sintered ceramic composite comprises a plurality of continuous composite fibers.

2. The die of claim 1, wherein the fiber-reinforced, sintered ceramic composite is partially formed of a polymeric sol-gel.

3. The die of claim 2, wherein the polymeric sol-gel is selected from at least one of an organosilane and a glass ceramic sol.

4. The die of claim 3, wherein the fiber-reinforced, sintered ceramic composite further includes at least one silicon carbide fibers and aluminum oxide fibers.

5. The die of claim 1, wherein the liner is performed and the cast portion of the die body is cast onto a side of the liner opposite the forming surface.

6. The die of claim 4, wherein the liner is a composite that has been laid-up in a predetermined shape, cured and sintered.

7. The die of claim 1, wherein the composite includes a ceramic material selected from a group consisting of silicon carbide fibers and aluminum oxide fibers.

8. The die of claim 1, wherein the liner has a thickness of between about 2.0 mm and about 3.2 mm.

9. The die of claim 1, wherein the first material is selected from a group of materials consisting of phenolic and ceramic.

10. The die of claim 9, wherein the ceramic is castable fused silica.

11. The die of claim 1, further comprising a plurality of lateral and transverse reinforcing rods extending through the die body in separate planes.

12. The die of claim 11, wherein the reinforcing rods are formed of a material that is not susceptible to inductive heating or being electrically conductive and are arranged in a manner so as to not be susceptible to inductive heating.

13. The die of claim 11, wherein the reinforcing rods are tensioned to supply a compressive force that is exerted to the die body.

14. The die of claim 1, further comprising a plurality of induction coil segments imbedded within the die body.

15. The die of claim 14, wherein each of the coil segments is a copper tube and wherein the coil segments are cast into the die body adjacent the forming surface in a spaced arrangement to provide a substantially spatially uniform magnetic field across a workpiece when the coil segments are electrically connected together to form a coil and the coil is energized.

16. The die of claim 14, wherein the first and second materials are not susceptible to inductive heating.

17. A die liner for use in a die having a die body, the die liner being a discrete structure that is configured to be used in conjunction with the die body, the die liner defining a forming surface for forming the workpiece, the surface for forming the workpiece being made of a fiber-reinforced, sintered ceramic composite; and
    wherein the fiber-reinforced, sintered ceramic composite comprises a plurality of continuous composite fibers.

18. The die liner of claim 17, wherein the die liner is slip cast in a predetermined shape.

19. The die liner of claim 17, wherein the liner is a composite that has been laid-up in a predetermined shape, cured and sintered.

20. The die liner of claim 17, wherein the die liner has a thickness of about 2.0 mm to about 3.2 mm.

21. The die liner of claim 17, wherein the die liner is not susceptible to induction heating.

22. A method for forming a part at elevated temperature comprising the step of:
    expanding a heated blank into contact with a forming surface in a die, the forming surface being made from a durable, inert, fiber-reinforced, sintered ceramic composite; and
    wherein the durable, inert, fiber-reinforced, sintered ceramic composite comprises a plurality of continuous composite fibers.

23. The method of claim 22, wherein the durable, inert, fiber-reinforced, sintered ceramic composite forms a thin liner in the die that is backed with a castable ceramic.

24. The method of claim 23, further comprising the steps of:
    heating the blank inductively to a forming temperature; and
    expanding the blank at the forming temperature with a pressurized fluid.

25. The method of claim 23, further comprising the step of:
    replacing the liner when worn while reusing the castable ceramic.

26. The method of claim 22, further comprising the steps of:
    heating the blank inductively to a forming temperature; and
    expanding the blank at the forming temperature with a pressurized fluid.

27. The die liner of claim 17, wherein the fiber-reinforced, sintered ceramic composite is partially formed of a polymeric sol-gel.

28. The die of claim 27, wherein the polymeric sol-gel is selected from at least one of an organosilane and a glass ceramic sol.

29. The die of claim 28, wherein the fiber-reinforced, sintered ceramic composite further includes at least one silicon carbide fibers and aluminum oxide fibers.

* * * * *